under 35 U.S.C. 154(b) by 145 days.

United States Patent
Schwartz et al.

(10) Patent No.: US 11,625,375 B1
(45) Date of Patent: Apr. 11, 2023

(54) BATCH PROCESSING WITH RANDOM ACCESS FOR TRANSACTION HISTORY

(71) Applicant: Amazon Technologies, Inc., Seattle, WA (US)

(72) Inventors: Ryan Schwartz, Vancouver (CA); Boyang Tom Jin, Vancouver (CA); Abhishek Sahay, North Vancouver (CA); Nicholas Leong, Coquitlam (CA); Desmond Zhou, Delta (CA); Yuan Bian, Vancouver (CA); Jean-Christophe Libbrecht, Vancouver (CA); Yiu Pong Lam, Vancouver (CA); Hyun Jung Cho, New Westminster (CA); Douglas Baldwin Dance, Kent, WA (US); Rong Wang, Vancouver (CA); Victoria Wong, Richmond (CA)

(73) Assignee: Amazon Technologies, Inc., Seattle, WA (US)

( * ) Notice: Subject to any disclaimer, the term of this patent is extended or adjusted under 35 U.S.C. 154(b) by 145 days.

(21) Appl. No.: 17/105,252

(22) Filed: Nov. 25, 2020

(51) Int. Cl.
*G06F 16/30* (2019.01)
*G06F 16/22* (2019.01)
*G06F 16/23* (2019.01)

(52) U.S. Cl.
CPC .............. *G06F 16/22* (2019.01); *G06F 16/23* (2019.01)

(58) Field of Classification Search
CPC .... G06F 16/287; G06F 16/22; G06F 16/2423; G06F 16/533
USPC ........ 707/609, 687, 705, 769, 790, 813, 821
See application file for complete search history.

(56) References Cited

U.S. PATENT DOCUMENTS

| 5,649,117 A * | 7/1997 | Landry ................ G06Q 20/102 705/40 |
| 6,996,542 B1 * | 2/2006 | Landry ................ G06Q 20/04 705/40 |
| 8,078,518 B2 | 12/2011 | Goertz et al. |
| 8,165,933 B2 | 4/2012 | Dryer et al. |
| 8,768,797 B2 | 7/2014 | Schock et al. |
| 9,679,266 B2 | 6/2017 | Brown |
| 10,250,694 B2 | 4/2019 | Mankovskii et al. |
| 10,417,639 B1 | 9/2019 | Beatty et al. |
| 10,643,202 B2 | 5/2020 | Castinado et al. |
| 10,747,608 B2 | 8/2020 | Nair et al. |
| 2001/0032183 A1 * | 10/2001 | Landry ................ G06Q 20/14 705/40 |

(Continued)

*Primary Examiner* — Sana A Al-Hashemi
(74) *Attorney, Agent, or Firm* — Robert C. Kowert; Kowert, Hood, Munyon, Rankin & Goetzel, P.C.

(57) ABSTRACT

Methods, systems, and computer-readable media for batch processing with random access for transaction history are disclosed. A batch processing system receives a batch comprising records of events, including a first record of a first event and a second record of a second event. The system assigns the first and second records to a group based (at least in part) on determining that the events are related. The system determines that the group is related to a match set comprising one or more prior events. The system updates one or more values in the match set based (at least in part) on the first and second records. The system stores the updated match set and one or more additional match sets using a storage object. The system retrieves the match set and not the one or more additional match sets from the storage object using an index.

20 Claims, 5 Drawing Sheets

(56) References Cited

U.S. PATENT DOCUMENTS

| | | | |
|---|---|---|---|
| 2007/0033374 A1* | 2/2007 | Sinclair | G06F 12/0246 |
| | | | 711/E12.008 |
| 2007/0162308 A1* | 7/2007 | Peters | G06Q 10/06 |
| | | | 705/2 |
| 2015/0269494 A1* | 9/2015 | Kardes | G06F 16/355 |
| | | | 706/12 |

* cited by examiner

BATCH PROCESSING WITH RANDOM ACCESS FOR TRANSACTION HISTORY

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services or systems that interact with clients. As the scale and scope of distributed systems have increased, the tasks of provisioning, administering, and managing system resources have become increasingly complicated. For example, the costs to manage distributed resources can increase with the complexity and scale of the resources.

Figure 1:
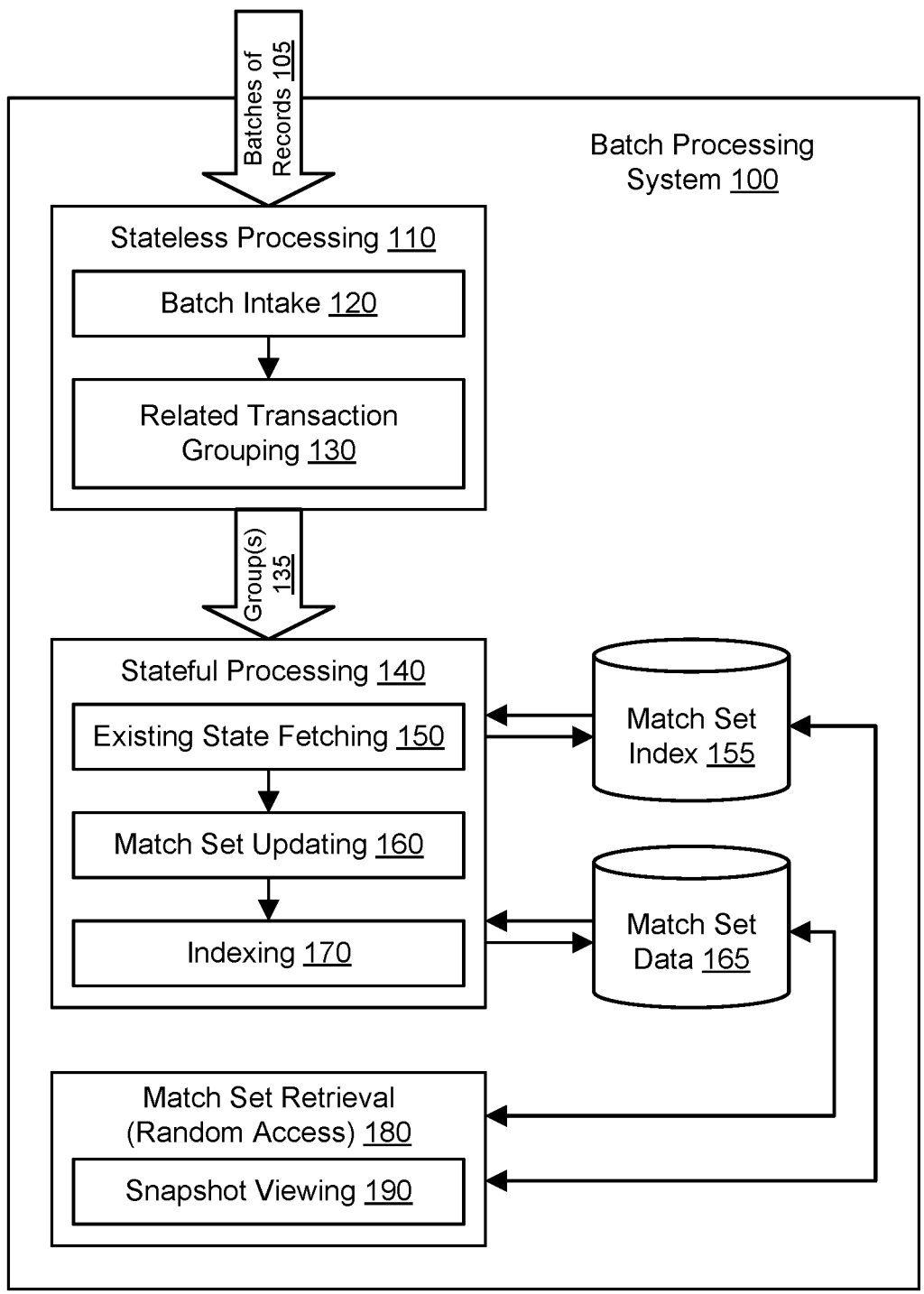
FIG. 1 illustrates an example system environment for batch processing with random access for transaction history, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Embodiments of methods, systems, and computer-readable media for batch processing with random access for transaction history are described. In a complex system such as a cloud provider network or an Internet-accessible store, large numbers of transactions or events may be generated over any given interval of time. For example, many events regarding the use of cloud-based computing resources by clients of a provider network may be generated in a given time period. As another example, thousands or millions of financial transactions in an online store may be observed in a given time period. A batch processing system may periodically receive batches of such data, transform the data (e.g., by grouping related events or transactions and calculating updated values), and produce output. For example, transactions that represent ledger lines for an online store may be grouped with related transactions such that up-to-date balances can be calculated and reported to relevant downstream entities or services, e.g., for balance sheet reconciliation. With a sufficiently large volume of events or transactions in a given time interval, some batch processing systems may struggle to maintain availability. Additionally, clients may wish to look at the history of a particular set of related transactions, e.g., to see how a subledger balance changes over time as new transactions are added.

The aforementioned challenges, among others, are addressed by embodiments of the techniques described herein, whereby a batch processing system may offer scalability, reliability, and visibility for batches of transactions or events. The batch processing system may receive batches of transactions or events at regular intervals (e.g., every two minutes). The batch processing system may group related transactions or events (match sets) in an interval without reference to existing match sets. For example, related transactions may be grouped according to a transaction-specific attribute that indicates that transactions are related by their respective account numbers. The batch processing system may then assign those groups to existing match sets that represent related transactions or events from earlier points in time, while storing updates to values (e.g., match set deltas) in those match sets according to the effects of the newest transactions or events. A relatively large number of match sets may be stored together in a storage object using a storage service. The match sets may be indexed by location (e.g., byte offset and size) such that individual match sets can be retrieved from a storage object without necessarily having to retrieve other match sets. Updates to a match set may refer to previous states of the match set such that the history of the match set may be traversed to determine its state (e.g., a balance, sum, or other value) at various points in time. The match set data may be consumed by a downstream reporting solution. For example, a downstream solution may consume match set data to produce financial reports on open balances for internal accounts and company codes for an online store. As another example, a downstream solution may consume match set data to produce usage reports for resources in a multi-tenant provider network.

As one skilled in the art will appreciate in light of this disclosure, embodiments may be capable of achieving certain technical advantages, including some or all of the following: (1) improving the scalability of batch processing for large match sets of related transactions or events; (2) improving the scalability of batch processing for large numbers of match sets in a batch; (3) improving the reliability of batch processing for batches of transactions or events; (4) improving the visibility of match sets, including historical views at different dates; (5) reducing the latency of match set storage by storing a relatively large number of match sets using a relatively small number of storage objects in a storage service; (6) reducing the use of computing resources and network resources by retrieving only desired match set(s) from storage objects that include large numbers of other match sets; (7) reducing the latency of data retrieval by retrieving only desired match set(s) from storage objects that include large numbers of other match sets; and so on.

FIG. 1 illustrates an example system environment for batch processing with random access for transaction history, according to some embodiments. A batch processing system 100 may offer scalability, reliability, and visibility for batches of records. As shown in FIG. 1, the batch processing system 100 may receive a batch 105 of records. The records may describe attributes of transactions or events. For example, events regarding the use of cloud-based computing resources by clients of a provider network may be generated and captured in the batch 105. As another example, financial transactions in an online store may be observed in a given time period, and corresponding records may be captured in the batch 105. In some embodiments, the records in a particular batch 105 may be associated with a particular time period or interval of time. For example, a new batch may be received by the system 100 for each two-minute interval. The records in a batch 105 may represent transactions or events that occurred during the time interval and/or transactions or events that occurred earlier but that were added to the batch during the time interval. For example, the batch 105 may include a first record of a first event or transaction and a second record of a second event or transaction. In some embodiments, the records in a particular batch 105 may not necessarily be grouped by timestamp but may represent a grouping of records that does not overlap with the records in any other batch. A batch 105 may include a large number of records, e.g., thousands or millions. An individual record in a batch 105 may have a booking time that represents the time at which the record is recognized (e.g., booked) by an upstream component (e.g., a ledger component) that creates the batch. The upstream component may receive these records in real-time, assign them booking times, and create new batches at appropriate intervals (e.g., every two minutes).

The system 100 may receive the batch 105 using a component for batch intake 120. In some embodiments, an orchestrator may check an upstream component for the availability of new batches and may ask the intake 120 to retrieve a new batch when available. The batch intake 120 and/or other operations may be performed using stateless processing 110, e.g., processing of an incoming batch without reference to prior batches. In some embodiments, individual records in a batch 105 may be processed by the system 100, including the batch intake 120, according to record-level attributes. For example, an individual record may be associated with a configuration or other definition that indicates that the record should be processed using the batch processing system 100. In some embodiments, in the absence of such a configuration or definition, an individual record may be discarded by the batch processing system. The configuration or other definition may also indicate how the record should be processed, e.g., how to identify related events or transactions according to record-level attributes, how to calculate sums or balances for the group of events or transactions, how to summarize or calculate aggregate values (e.g., mean values), how to calculate aging dates, and so on. In some embodiments, the configuration or other definition may be indicated according to an identifier in a record and then retrieved by the batch processing system 100 using the identifier. In some embodiments, the intake 120 may perform validation of individual records to ensure that all attributes required for correct batch processing are present.

Using a component for related transaction grouping 130, the batch processing system 100 may determine one or more match sets among individual records in the batch. A match set may represent related transactions or related events. For example, the system may assign the first record and the second record in the batch 105 to a group (also called a match set) based (at least in part) on a determination that the records are related. The determination that the records are related may be made according to a configuration or definition associated with the records and also according to attribute values for the records. The configuration or definition may indicate that transactions or events should be grouped into match sets according to one or more attribute values, e.g., account numbers, order numbers, transaction or event types, resource types, and so on. For example, if the records describe events related to usage of computing resources in a cloud provider network, then the records in a given match set may share an account number and a resource type and may be assigned to that match set according to those values. As another example, if the records describe ledger lines for financial transactions in an online store, then the records in a given match set may share an account number and an order number and may be assigned to that match set according to those values.

In some embodiments, the batch intake 120 and/or related transaction grouping 130 may be performed using one or more MapReduce clusters. The MapReduce model may permit the processing of large data sets using distributed computing resources (e.g., the cluster(s)). The MapReduce model for the stateless processing 110 may include one or more Map procedures which perform tasks such as filtering and sorting, e.g., to determine which records are to be processed and which are to be discarded. A Map procedure may convert a batch identifier to thousands or millions of individual journal entries (representing the individual records) and then convert the journal entries to journal lines. A Map procedure may filter the journal lines based on a record-level attribute that determines whether a record should be processed or discarded. A Map procedure may perform additional transformations, e.g., to convert the journal line into a format that can be matched with other journal lines for the purpose of grouping. Such transformations may be performed according to the record-level configuration or definition. In some embodiments, a journal line may be transformed to determine a match set delta that represents the impact or effect of the transaction or event for a particular accounting date or other point in time. The match set deltas may be used to determine the state of a balance, sum, or other value for the match set at a particular time. The MapReduce model for the stateless processing 110 may include one or more Reduce procedures which perform tasks such as summarizing or aggregating output of the Map procedure, e.g., to group related records. A Reduce procedure may combine a journal line identifier and a match set identifier into a match item for a match set identifier. A Reduce procedure may combine the match set deltas based on the match set identifiers. The output of the MapReduce cluster(s) may be stored for use as input to additional operations, e.g., using a storage service. In some embodiments, the match item data may be stored during stateless processing 110 while the match items are aggregated into match set deltas, but individual match items may not be passed to a stateful processing stage 140 to mitigate the effects of passing a very large match set (e.g., millions of items) on performance, availability, and storage resources.

The related transaction grouping 130 may produce one or more groups 135 of related records as output. In some embodiments, an individual record may be output by the related transaction grouping 130 for a given match set if no other records for that match set were identified in the batch.

The one or more groups 135 (and potentially any individual records) may be used as input for a stateful processing pipeline or system 140. The stateful processing pipeline 140 may perform one or more tasks with reference to existing match sets from prior batches. The existing match sets may be stored in a repository of match set data 165. As will be described in greater detail below, the match set data 165 may be indexed for efficient retrieval of particular match sets using a match set index 155.

The stateful processing pipeline 140 may take in group(s) 135 and perform state fetching, combining, and updating based on those group(s) 135. The stateful processing pipeline 140 may include a component for existing state fetching 150, a component for match set updating 160, and/or a component for indexing 170. Using the component for existing state fetching 150, the batch processing system 100 may identify and retrieve an existing match set to which one of the group(s) 135 is related. The existing state fetcher may read a list of the match set identifiers produced by the stateless processing 110. For example, the group including the first record and the second record may be assigned to an existing match set whose other records share the same attribute value(s) according to which the particular records are to be grouped. The existing match sets may have been generated and/or updated in processing batches from prior time intervals. In some embodiments, the batch processing system may create a new match set to include the output of the related transaction grouping 130, e.g., if no existing match set can be found that shares the same attribute value(s) according to which a particular record is to be grouped.

Using the component for match set updating 160, the batch processing system 100 may store updates to one or more values in the existing match set. The updates may be represented by match set deltas. The one or more values may be updated according to the effects of the newest transactions or events, e.g., according to state changes indicated by match set deltas. In some embodiments, a match set may be updated according to the configuration or definition indicated by one or more record-level attributes. For example, the records in a match set may be associated with a configuration or other definition that indicates how to calculate sums or aggregate values for the group of events or transactions. Updating the value(s) for a match set may include adding numbers, subtracting numbers, averaging numbers, and other such operations. For example, if the records represent subledger lines for transactions in an online store, then a match set delta may be stored to represent credits or debits associated with a particular account and/or a particular order. As another example, if the records represent resource usage in a provider network, then a match set delta may be stored to represent additional resource usage associated with a particular account and/or a particular resource type. A match set may include records (and corresponding match set deltas) spanning minutes, hours, days, or even months. In some embodiments, when an update is stored, a reference to the previous index entry may also be stored. In some embodiments, a series of such references to index entries may be stored using a linked list for potential traversal of match set history.

The batch processing system may store an updated or newly created match set in a storage object with other match sets, e.g., in the repository of match set data 165. The storage object may be maintained in a storage service accessible to the batch processing system, e.g., in a storage bucket. To conserve use of storage resources and provide for more efficient use of the storage service, a relatively large number of match sets may be stored together in a particular storage object. The stored match set may provide snapshots (match set views) of match set balances according to various match set deltas that were aggregated during the stateless processing stage. In some embodiments, the stored match set may represent one match set view for each accounting date for which the match set had changes. In some embodiments, the storage object may represent consecutive lines of alphanumeric text. A match set may be represented over numerous lines or rows in a storage object.

Using the component for indexing 170, the batch processing system 100 may index the location of the match set within the storage object. For example, the index entry for a match set in the match set index 155 may indicate the identifier of the object, the byte offset at which the match set begins, and the size (e.g., in bytes) of the match set. Match sets may be indexed by location (e.g., byte offset and size) such that individual match sets can be retrieved from a storage object without necessarily having to retrieve other match sets in the same storage object. Examples of indexing are discussed below with respect to FIG. 3. In some embodiments, the indexing 170 may be implemented using a serverless compute service that performs functions on behalf of the system 100, e.g., to calculate the byte offsets and sizes of match sets. In some embodiments, match items may be represented using the match set index 155, e.g., by indexing the latest match items are included in match set data stored as part of stateful processing 140. The match set index 155 may be used to retrieve the match set view data. The match set view data may include index information for the match items so that the specific match items for the match set can be retrieved without having to read all item data. In some embodiments, the stateful processing 140 may store the match set views but not the match item information, and the match item indexes may permit retrieval of specific match item information if required.

In some embodiments, the state fetching 150, match set updating 160, and/or indexing 170 may be performed using one or more MapReduce clusters. As discussed above, the MapReduce model may permit the processing of large data sets using distributed computing resources (e.g., the cluster(s)). The MapReduce model for the stateful processing 140 may include a Map procedure which performs tasks such as filtering and sorting, e.g., to determine which existing match sets should be updated. In such a Map step, different computing resources within a MapReduce cluster may be assigned different segments or portions of the match sets. A Map procedure may use the index 155 to determine whether a match set identifier is currently stored in the match set data 165. If so, the Map procedure may retrieve the match set from the match set data 165 using its index entry. The MapReduce model for the stateful processing 140 may include a Reduce procedure which performs tasks such as summarizing or aggregating output of the Map procedure according to match set identifiers, e.g., to update the existing match sets with match set deltas or to create new match sets.

In some embodiments, the batch processing system 100 may include a component for match set retrieval 180. The match set retrieval 180 may use the match set index 155 to perform random access of the match set data 165. By implementing random access using the match set index 155, the batch processing system 100 may retrieve a particular match set from its storage object without retrieving any other match sets from the same storage object. For example, the match set retrieval 180 may begin reading from the storage object at the byte offset indicated in the index 155 for a particular match set and may stop reading when the size of the object has been reached. The match set retrieval 180 may be used to perform snapshot viewing 190 of match sets, where a particular snapshot represents the state of a match set (e.g., the state of one or more balances, sums, or other values) at a particular point in time. A match set may be retrieved to enable a client to view the current state of the match set (e.g., a current sum or aggregated value that takes into account all transactions or events). In some embodiments, updates to a match set may refer to previous index entries for previous states of the match set such that the history of the match set may be traversed to determine its state at various points in time. The match set may be retrieved to enable a client to view a historical state of the match set (e.g., a historical sum or aggregated value that does not take into account one or more later transactions or events). By traversing the history of the match set, the match set retrieval 180 may retrieve all the match items for a match set, where each new version of the match set may have a match item index for the match items added in that version. The random access retrieval of the match items may be similar to the random access retrieval of match sets, except that there may be multiple match items associated with a single stateless update for a match set. This random access retrieval may permit exploration of match items over time in addition to exploration of match set views over time), thus providing the exact transactions that contributed to a match set throughout its lifecycle.

In some embodiments, the match set data 165 may be consumed by one or more downstream reporting solutions. For example, a downstream solution may consume match set data 165 to produce financial reports on open balances for internal accounts and company codes for an online store. Using the system 100, ledger lines may be grouped into match sets that give information to an organization's accounting and finance departments about unsettled receivables, payables, cash, and deferred revenue. As another example, a downstream solution may consume match set data 165 to produce usage reports for resources in a multi-tenant provider network. To enable these downstream solutions, the batch processing system 100 may provide scalability for large numbers of match sets and/or match sets with large numbers of records. The system 100 may provide consistency checks between components (e.g., using checksums) and ensure that data handoff and transformations result in the correct amounts being applied.

In one embodiment, one or more components of the batch processing system 100 may be implemented using resources of a provider network. The provider network may represent a network set up by an entity such as a private-sector company or a public-sector organization to provide one or more services (such as various types of network-accessible computing or storage) accessible via the Internet and/or other networks to a distributed set of clients. The provider network may include numerous services that collaborate according to a service-oriented architecture to provide the functionality and resources of the system 100. For example, the system 100 may be implemented using a service-oriented architecture in which various services perform complex tasks by sending requests and responses using service interfaces. The system 100 may offer one or more service interfaces by which clients (e.g., other services) may request batch processing and/or match set retrieval tasks. A service interface may be implemented as an application programming interface (API) or other programmatic interface. For example, a client of the system 100 may use an API to provide batches of transaction data to be processed and stored. As another example, a client of the system 100 may use an API to select one or more match sets and dates for which snapshots are sought. In some embodiments, a user interface (e.g., a graphical user interface) may be built on top of the API(s) or other programmatic interface(s) such that end users may invoke the functionality of the system 100, e.g., to view the state of a match set at various points in time.

The provider network may include numerous data centers hosting various resource pools, such as collections of physical and/or virtualized computer servers, storage devices, networking equipment and the like, that are used to implement and distribute the infrastructure and services offered by the provider. Compute resources may be offered by the provider network to clients in units called "instances," such as virtual or physical compute instances. In one embodiment, a virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). In various embodiments, one or more aspects of the system 100 may be implemented as a service of the provider network, the service may be implemented using a plurality of different instances that are distributed throughout one or more networks, and each instance may offer access to the functionality of the service to various clients. Because resources of the provider network may be under the control of multiple clients (or tenants) simultaneously, the provider network may be said to offer multi-tenancy and may be termed a multi-tenant provider network. The provider network may be hosted in the cloud and may be termed a cloud provider network or cloud-based network. In one embodiment, portions of the functionality of the provider network, such as the system 100, may be offered to clients in exchange for fees.

Figure 5:
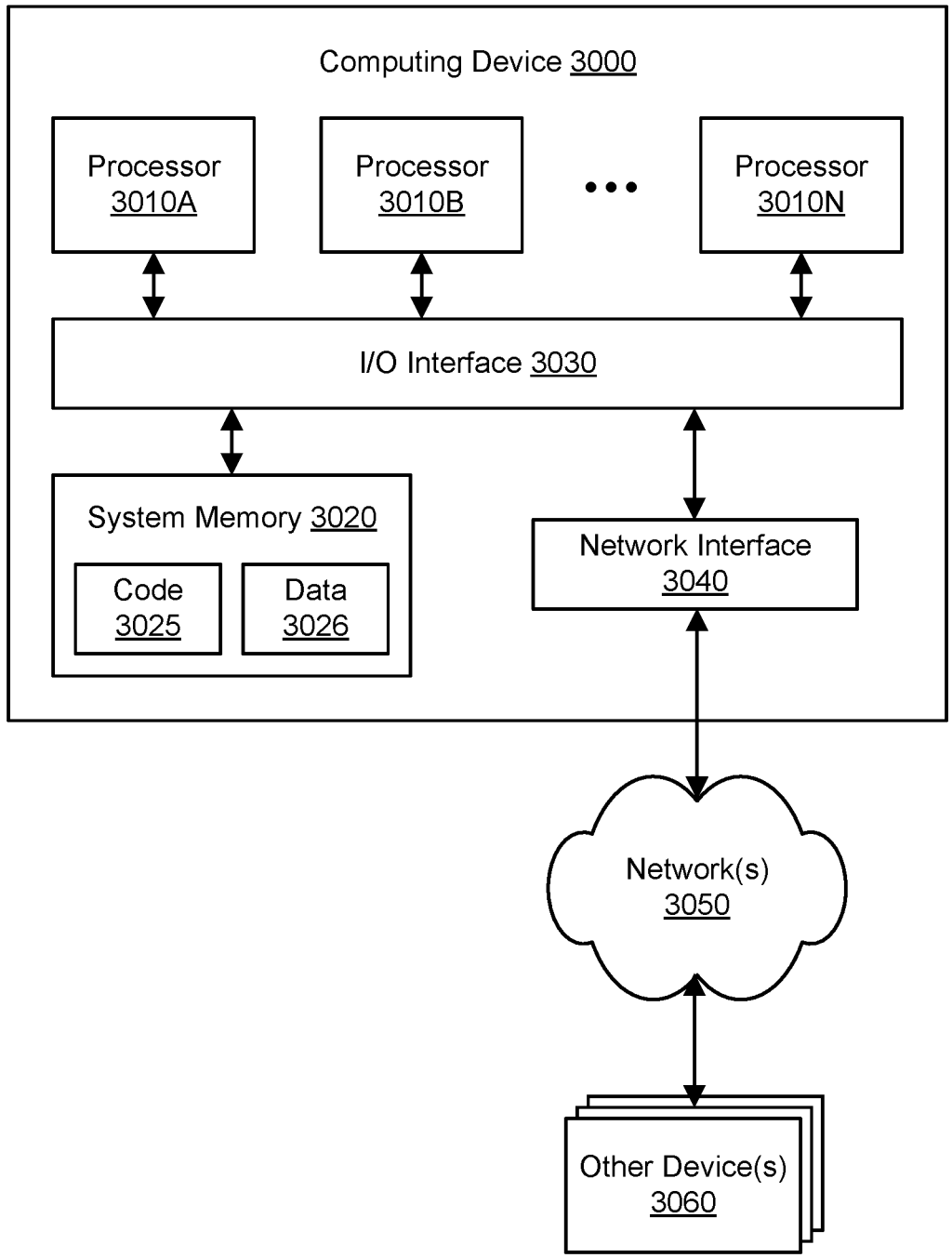
FIG. 5 illustrates an example computing device that may be used in some embodiments.

In various embodiments, components of the system 100 may be implemented using any suitable number and configuration of computing devices, any of which may be implemented by the example computing device 3000 illustrated in FIG. 5. In some embodiments, the computing devices may be located in any suitable number of data centers or geographical locations. In various embodiments, at least some of the functionality of the system 100 may be provided by the same computing device or by different computing devices. In various embodiments, if any of the components of the system 100 are implemented using different computing devices, then the components and their respective computing devices may be communicatively coupled, e.g., via one or more networks. Any of the components of the system 100 may represent any combination of software and hardware usable to perform their respective functions. In some embodiments, operations implemented by the system 100 may be performed automatically, e.g., without a need for user initiation or user intervention after an initial configuration stage, and/or programmatically, e.g., by execution of program instructions on at least one computing device. In some embodiments, the system 100 may include additional components not shown, fewer components than shown, or different combinations, configurations, or quantities of the components shown.

Clients of the system 100 may represent external devices, systems, or entities with respect to the system. Client devices may be managed or owned by one or more customers of the system 100, e.g., other services or other departments within the same entity that offers the batch processing system. In one embodiment, the client devices may be implemented using any suitable number and configuration of computing devices, any of which may be implemented by the example computing device 3000 illustrated in FIG. 5. Clients may convey network-based service requests to the system 100 via one or more networks, e.g., to provide transaction data for batch processing and/or select match set views. The network(s) may encompass any suitable combination of networking hardware and protocols necessary to establish network-based communications between client devices and the system 100. For example, the network(s) may generally encompass the various telecommunications networks and service providers that collectively implement the Internet. In one embodiment, the network(s) may also include private networks such as local area networks (LANs) or wide area networks (WANs) as well as public or private wireless networks. For example, both a given client device and the system 100 may be respectively provisioned within enterprises having their own internal networks. In one embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the system 100. In one embodiment, client devices may communicate with the system 100 using a private network rather than the public Internet. In various embodiments, the various components of the system 100 may also communicate with other components of the system using one or more network interconnects.

Figure 2:
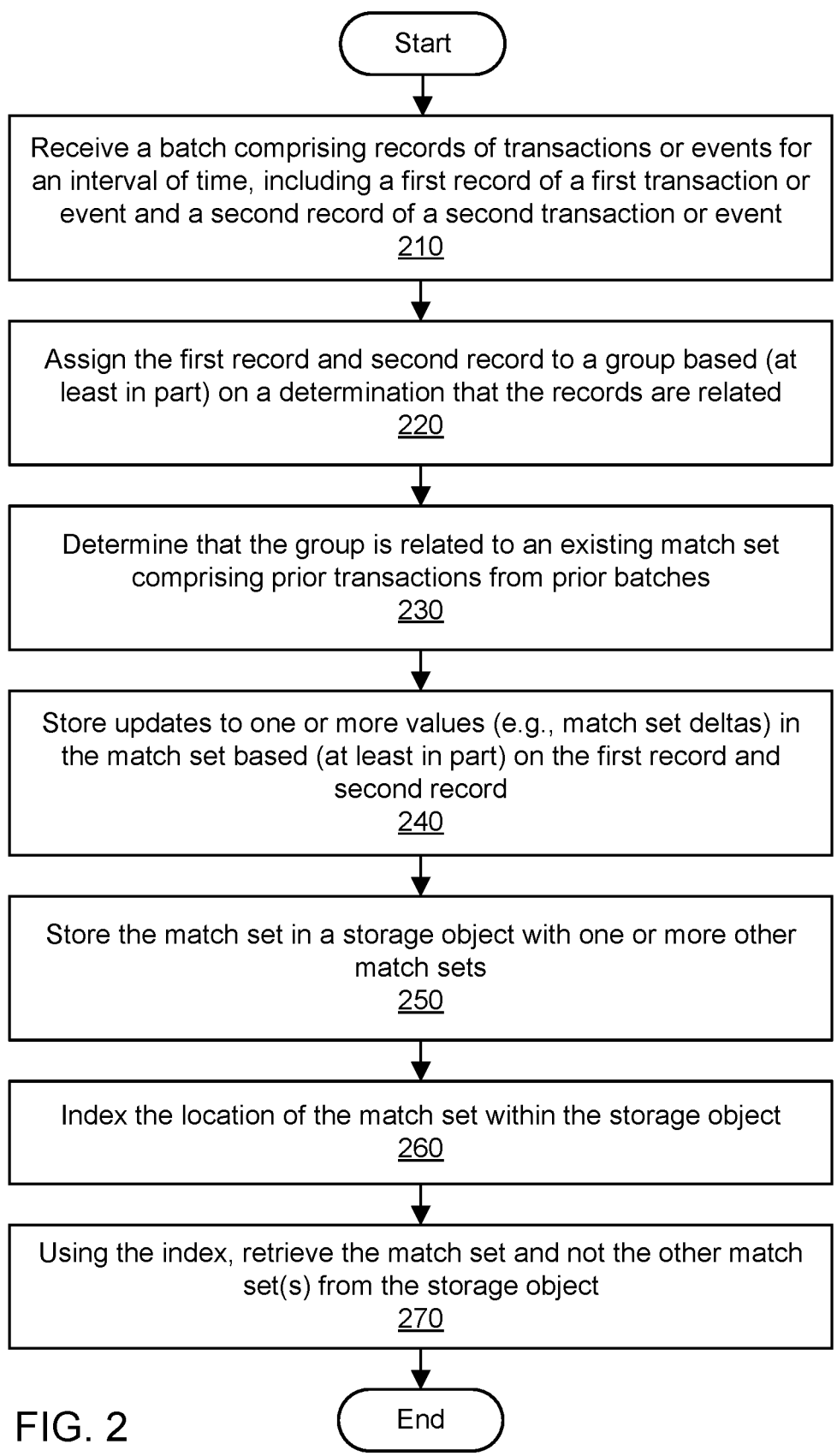
FIG. 2 is a flowchart illustrating a method for batch processing with random access for transaction history, according to some embodiments.

FIG. 2 is a flowchart illustrating a method for batch processing with random access for transaction history, according to some embodiments. As shown in 210, a batch processing system may receive a batch of records. The records may describe attributes of transactions or events. For example, events regarding the use of cloud-based computing resources by clients of a provider network may be generated and captured in a batch. As another example, financial transactions in an online store may be observed in a given time period, and corresponding records may be captured in a batch. The records in a batch may be associated with a particular time period or interval of time. For example, a new batch may be received for each two-minute interval. The records in a batch may represent transactions or events that occurred during the time interval and/or transactions or events that occurred earlier but that were added to the batch during the time interval. The batch received in 210 may include a first record of a first event or transaction and a second record of a second event or transaction. A batch may include a large number of records, e.g., thousands or millions.

In some embodiments, individual records in a batch may be processed according to record-level attributes. For example, an individual record may be associated with a configuration or other definition that indicates whether or not the record should be processed using the batch processing system or (in the absence of such a configuration or definition) discarded by the batch processing system. The configuration or other definition may also indicate how the record should be processed, e.g., how to identify related events or transactions, how to calculate sums for the group of events or transactions, and so on. In some embodiments, the configuration or other definition may be indicated according to an identifier in a record and then retrieved by the batch processing system using the identifier.

As shown in 220, the batch processing system may determine one or more match sets among individual records in the batch. A match set may represent related transactions or related events. For example, the system may assign the first record and the second record to a group (also called a match set) based (at least in part) on a determination that the records are related. The determination that the records are related may be made according to a configuration or definition associated with the records and also according to attribute values for the records. The configuration or definition may indicate that transactions or events should be grouped into match sets according to one or more attribute values, e.g., account numbers, transaction or event types, and so on. For example, if the records describe events related to usage of computing resources in a cloud provider network, then the records in a given match set may share an account number and a resource type and may be assigned to that match set according to those values. As another example, if the records describe ledger lines for financial transactions in an online store, then the records in a given match set may share an account number and an order number and may be assigned to that match set according to those values.

The operation shown in 220 may be performed in a stateless manner, e.g., without reference to existing match sets from prior batches. In some embodiments, the operation shown in 220 may be performed using one or more MapReduce clusters. The MapReduce model may permit the processing of large data sets using distributed computing resources (the cluster(s)). The MapReduce model may include a Map procedure which performs tasks such as filtering and sorting. The MapReduce model may include a Reduce procedure which performs tasks such as summarizing or aggregating output of the Map procedure. In some embodiments, a large number of individual records may be grouped together in a particular match set. In some embodiments, an individual record may be output by the operation shown in 220 for a given match set if no other records for that match set were identified in the batch.

As shown in 230, the batch processing system may assign one or more individual records and/or one or more groups (match sets) determined in 220 to existing match sets. For example, the group including the first record and the second record may be assigned to an existing match set whose other records share the same attribute value(s) according to which the particular records are to be grouped. The existing match sets may have been generated and/or updated in processing batches from prior time intervals. In some embodiments, the batch processing system may create a new match set to include the output of the operation shown in 220, e.g., if no existing match set can be found that shares the same attribute value(s) according to which a particular record is to be grouped.

As shown in 240, the batch processing system may update one or more values in the match set. The one or more values may be updated according to the effects of the newest transactions or events. For example, updating the one or more values may include storing one or more match set deltas that indicate an increase or decrease over a previous value according to the effect of a particular record. In some embodiments, a match set may be updated according to the configuration or definition indicated by one or more record-level attributes. For example, the records in a match set may be associated with a configuration or other definition that indicates how to calculate sums, balances, summarized values, or aggregate values for the group of events or transactions. Updating the value(s) for a match set may include adding numbers, subtracting numbers, averaging numbers, and other such operations. For example, if the records represent subledger lines for transactions in an online store, then a match set may be updated to represent credits or debits associated with a particular account and/or a particular order. The operations shown in 230 and 240 may be performed in a stateful manner, e.g., with reference to existing match sets from prior batches. In some embodiments, the operations shown in 230 and 240 may be performed using one or more MapReduce clusters.

As shown in 250, the batch processing system may store the match set in a storage object with other match sets. The storage object may be maintained in a storage service accessible to the batch processing system, e.g., in a storage bucket. To conserve use of storage resources, a relatively large number of match sets may be stored together in a particular storage object. The match set may be stored as a list or collection of match set deltas, each representing a particular date. In some embodiments, the storage object may represent consecutive lines of alphanumeric text. A match set delta may indicate an increase or decrease over a previous value (e.g., match set balance) for the match set.

As shown in 260, the batch processing system may index the location of the match set within the storage object. For example, the index entry for a match set may indicate the identifier of the object, the byte offset at which the match set begins, and the size (e.g., in bytes) of the match set. Match sets may be indexed by location (e.g., byte offset and size) such that individual match sets can be retrieved from a storage object without necessarily having to retrieve other match sets in the same storage object. In some embodiments, the match set may have been retrieved for updating as shown in 240 by using the index.

As shown in 270, the batch processing system may retrieve the match set (updated in 240 and stored in 250) from its storage object without retrieving any other match sets from the same storage object. The match set may be retrieved to enable a client to view the current state of the match set (e.g., a current sum or aggregated value that takes into account all transactions or events). In some embodiments, updates to a match set may refer to previous states of the match set such that the history of the match set may be traversed to determine its state at various points in time. The match set may be retrieved to enable a client to view a historical state of the match set (e.g., a historical sum or aggregated value that does not take into account one or more later transactions or events). Different historical views may be generated by applying one or more match set deltas in the match set, where a match set delta indicates an increase or decrease over a previous value. The match set data may be consumed by a downstream reporting solution. For example, a downstream solution may consume match set data to produce financial reports on open balances for internal accounts and company codes for an online store. As another example, a downstream solution may consume match set data to produce usage reports for resources in a multi-tenant provider network.

Figure 3:
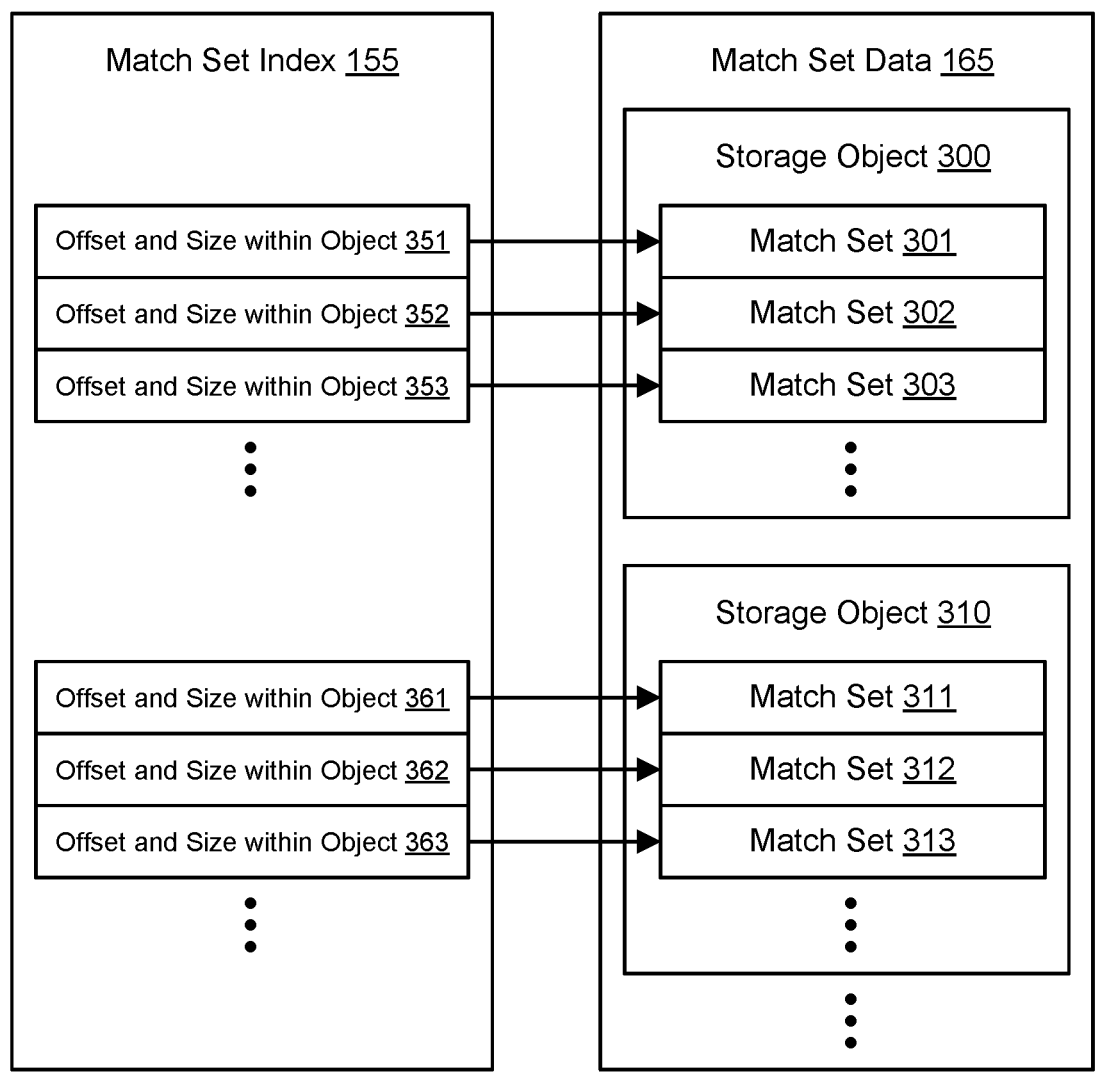
FIG. 3 illustrates further aspects of the example system environment for batch processing with random access for transaction history, including an index usable for random access of match sets, according to some embodiments.

FIG. 3 illustrates further aspects of the example system environment for batch processing with random access for transaction history, including an index usable for random access of match sets, according to some embodiments. As discussed above, the batch processing system 100 may index the locations of match sets within storage objects. Match sets may be retrieved using keys. As shown in the example of FIG. 3, the match set index 155 may include a set of index entries for match sets in storage objects 300, 310, and so on. Using an index entry 351, the match set index 155 may indicate the offset (e.g., in bytes) and size (e.g., in bytes) of a match set 301 in a storage object 300. If the match set 301 is the first in the storage object (e.g., on the first line), then the offset may be zero. Using an index entry 352, the match set index 155 may indicate the offset (e.g., in bytes) and size (e.g., in bytes) of a match set 302 in the storage object 300. If the match set 302 is the second in the storage object (e.g., on the second line), then the offset may be the same as the size of the first match set 301. Using an index entry 353, the match set index 155 may also indicate the offset (e.g., in bytes) and size (e.g., in bytes) of a third match set 303 in the storage object 300, and so on.

Using an index entry 361, the match set index 155 may indicate the offset (e.g., in bytes) and size (e.g., in bytes) of a match set 311 in a storage object 310. If the match set 311 is the first in the storage object (e.g., on the first line), then the offset may be zero. Using an index entry 362, the match set index 155 may indicate the offset (e.g., in bytes) and size (e.g., in bytes) of a match set 312 in the storage object 310. If the match set 312 is the second in the storage object (e.g., on the second line), then the offset may be the same as the size of the first match set 311. Using an index entry 363, the match set index 155 may also indicate the offset (e.g., in bytes) and size (e.g., in bytes) of a third match set 313 in the storage object 310, and so on. Match sets may be indexed by location (e.g., byte offset and size) such that individual match sets can be retrieved from a storage object without necessarily having to retrieve other match sets in the same storage object, thus conserving network bandwidth.

Figure 4:
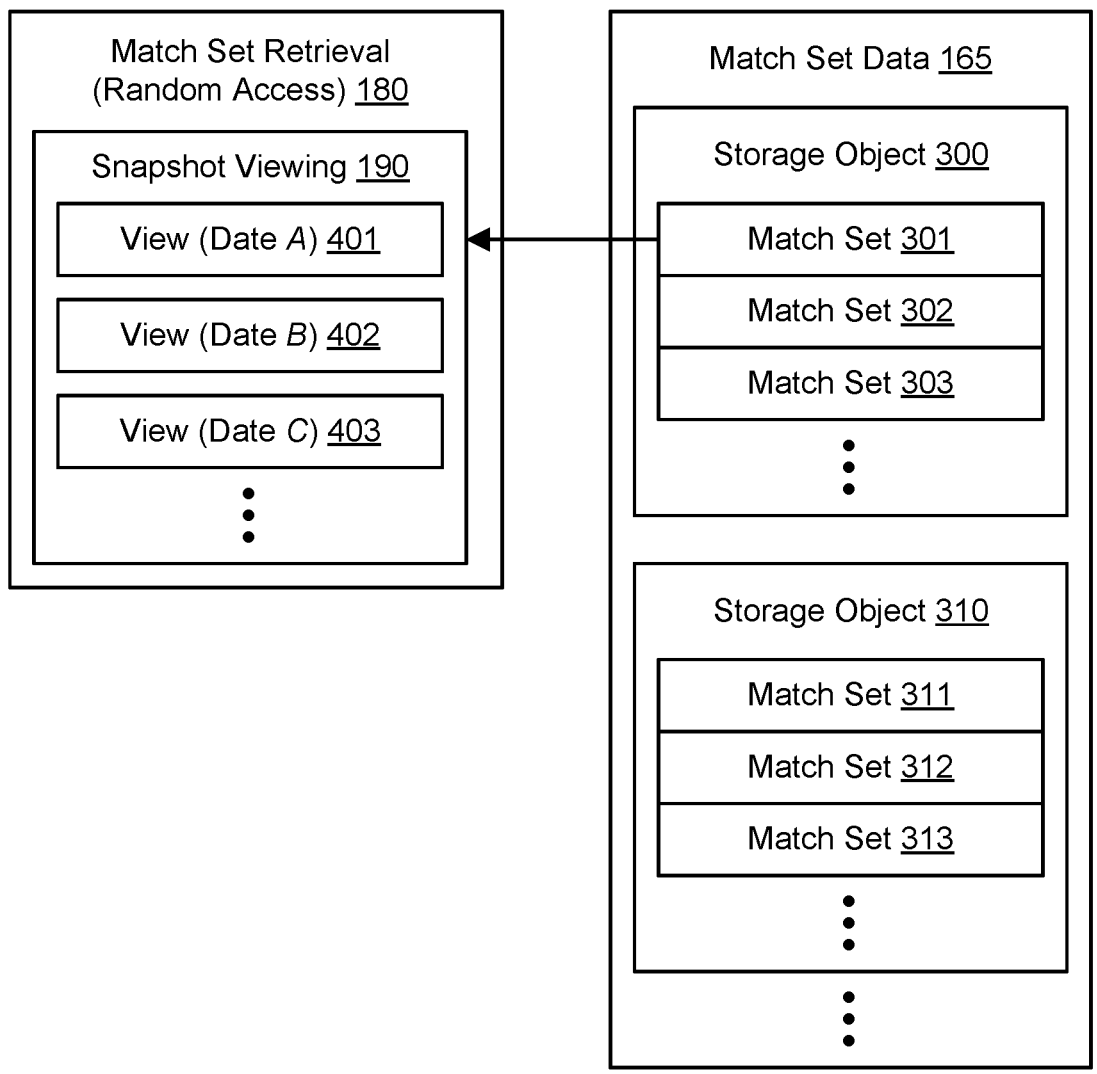
FIG. 4 illustrates further aspects of the example system environment for batch processing with random access for transaction history, including match set retrieval for exploration of match set views over time, according to some embodiments.

FIG. 4 illustrates further aspects of the example system environment for batch processing with random access for transaction history, including match set retrieval for exploration of match set views over time, according to some embodiments. As discussed above, the batch processing system 100 may include a component for match set retrieval 180. The match set retrieval 180 may use the match set index 155 to perform random access of the match set data 165. The match set retrieval 180 may be used to perform snapshot viewing 190 of match sets, where a snapshot represents the state of a match set (e.g., the state of one or more values) at a particular point in time. A match set may be retrieved to enable a client to view the current state of the match set (e.g., a current sum or aggregated value that takes into account all transactions or events). The match set may be retrieved to enable a client to view a historical state of the match set (e.g., a historical sum or aggregated value that does not take into account one or more later transactions or events). As shown in the example of FIG. 4, the snapshot viewing 190 may enable a client to view the state of a match set 301 at a variety of points in time (e.g., specific dates and/or times). Using the snapshot viewing 190, a client may access a view 401 at a first date/time A, a view 402 at a second date/time B, a view 403 at a third date/time C, and so on. The views 401, 402, and 403 may be generated by applying one or more match set deltas in the match set, where a match set delta indicates an increase or decrease over a previous value. One or more values associated with the match set may vary at the various dates/times represented by the views 401-403. For example, if the match set 301 represents aggregate usage over time of a particular type of computing resource by a particular client of a cloud provider network, then the usage value may tend to increase with each successive event represented in the match set. As another example, if the match set 301 represents the average number of instances of a particular type of computing resource that are used by a particular client of a cloud provider network, then the average may increase, decrease, or stay the same at various dates/times.

Illustrative Computer System

In at least some embodiments, a computer system that implements a portion or all of one or more of the technologies described herein may include a computer system that includes or is configured to access one or more computer-readable media. FIG. 5 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 5 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
a batch processing system comprising one or more processors and one or more memories to store computer-executable instructions that, when executed, cause the one or more processors to:
receive a batch comprising a plurality of records of transactions for an interval of time, wherein the records comprise a first record of a first transaction and a second record of a second transaction;
process the batch to assign the first record and the second record to a group based at least in part on a determination that the first transaction and the second transaction are related and to assign other records of the batch to another group based at least in part on a determination that respective transactions of the other records are related;
determine that the group is related to an existing match set representing one or more prior transactions from one or more prior batches, and determine that the other group is related to another existing match set representing one or more other prior transactions;
update one or more values in the existing match set based at least in part on the first record and the second record, wherein the one or more values are updated using a plurality of match set deltas determined using the first record and the second record, and update one or more other values in the other existing match set based at least in part on one or more other match set deltas determined using the other records;
store the updated existing match set and the other updated existing match set in one or more storage objects, wherein the updated existing match set is stored in a first storage object of the one or more storage objects along with a plurality of additional existing match sets for differently grouped transactions;
index the updated existing match set using an offset of the updated existing match set and a size of the updated existing match set to provide an index entry for locating the updated existing match set within the first storage object; and
retrieve, responsive to a request, the updated existing match set and not the plurality of additional existing match sets from the first storage object using the index entry for the updated existing match set.

2. The system as recited in claim 1, wherein the first record and the second record are assigned to the group using a first MapReduce cluster, wherein at least a portion of the batch is an input to the first MapReduce cluster.

3. The system as recited in claim 2, wherein the one or more values in the existing match set are updated using a second MapReduce cluster, wherein the existing match set, one or more of the additional existing match sets, and the group comprising the first record and the second record are inputs to the second MapReduce cluster.

4. The system as recited in claim 1, wherein the one or more memories store additional computer-executable instructions that, when executed, cause the one or more processors to:
traverse a history of the existing match set using a plurality of updates to the existing match set, wherein the history comprises a plurality of views of the one or more values at a plurality of points in time.

5. A method, comprising:
receiving, by a batch processing system, a batch comprising a plurality of records of events, wherein the records comprise a first record of a first event and a second record of a second event that is related to the first event;
determining, by the batch processing system, that the first record and the second record are related to an existing match set representing one or more prior events;
updating, by the batch processing system, one or more values in the existing match set based at least in part on the first record and the second record;
storing, by the batch processing system, the updated existing match set in a storage object that stores one or more additional existing match sets; and
retrieving, by the batch processing system responsive to a request, the updated existing match set and not the one or more additional existing match sets from the storage object using an index indicative of a location of the updated existing match set within the storage object.

6. The method as recited in claim 5, further comprising:
storing, by the batch processing system using the index, an offset of the updated existing match set and a size of the updated existing match set within the storage object.

7. The method as recited in claim 5, wherein the first record and the second record are assigned to a group using a first MapReduce operation, wherein at least a portion of the batch is an input to the first MapReduce operation.

8. The method as recited in claim 7, wherein the one or more values in the existing match set are updated using a second MapReduce operation, wherein the one or more values are updated using a plurality of match set deltas determined using the first record and the second record, wherein the existing match set, one or more additional existing match sets, and the group comprising the first record and the second record are inputs to the second MapReduce operation.

9. The method as recited in claim 5, further comprising:
storing, by the batch processing system, a linked list comprising a plurality of index entries for updated versions of the existing match set.

10. The method as recited in claim 9, further comprising:
  traversing, by the batch processing system, at least a portion of a history of the existing match set using the plurality of index entries, wherein the history comprises a plurality of states of the one or more values at a plurality of points in time.

11. The method as recited in claim 5, wherein the events comprise transactions, wherein the existing match set in the storage object represents a plurality of states of the one or more values at a plurality of points in time, and wherein the plurality of states of the one or more values vary according to effects of the first event or the second event.

12. The method as recited in claim 5, wherein the batch processing system is hosted by a provider network and Internet-accessible by a plurality of clients via a service interface, and wherein the provider network offers a plurality of services including the batch processing system.

13. One or more non-transitory computer-readable storage media storing program instructions that, when executed on or across one or more processors, perform:
  receiving, by a batch processing system, a batch comprising a plurality of records of transactions, wherein the records comprise a first record of a first transaction and a second record of a second transaction;
  processing the batch to assign, by the batch processing system, the first record and the second record to a group based at least in part on a determination that the first transaction and the second transaction are related;
  determining, by the batch processing system, that the group is related to an existing match set representing one or more prior transactions in one or more prior batches;
  updating, by the batch processing system, one or more values in the existing match set based at least in part on the first record and the second record;
  storing, by the batch processing system, the updated existing match set in a storage object that stores one or more additional match sets; and
  retrieving, by the batch processing system responsive to a request, the updated existing match set and not the one or more additional match sets from the storage object using a byte offset of the updated existing match set and a size of the updated existing match set within the storage object.

14. The one or more non-transitory computer-readable storage media as recited in claim 13, wherein the first record and the second record are assigned to the group using a first MapReduce operation, wherein at least a portion of the batch is an input to the first MapReduce operation.

15. The one or more non-transitory computer-readable storage media as recited in claim 14, wherein the one or more values in the existing match set are updated using a second MapReduce operation, wherein the existing match set, the one or more additional existing match sets, and the group comprising the first record and the second record are inputs to the second MapReduce operation.

16. The one or more non-transitory computer-readable storage media as recited in claim 13, further comprising additional program instructions that, when executed on or across the one or more processors, perform:
  retrieving, by the batch processing system, the first record and the second record from the updated existing match set using a match item index associated with a match set view.

17. The one or more non-transitory computer-readable storage media as recited in claim 13, further comprising additional program instructions that, when executed on or across the one or more processors, perform:
  traversing, by the batch processing system, a history of the existing match set using a plurality of references to updates to the existing match set, wherein the history comprises a plurality of states of the one or more values at a plurality of points in time.

18. The one or more non-transitory computer-readable storage media as recited in claim 13, wherein the records comprise ledger lines, wherein the updated existing match set in the storage object represents a plurality of states of the one or more values at a plurality of points in time, and wherein the plurality of states of the one or more values vary according to effects of the first transaction and the second transaction.

19. The one or more non-transitory computer-readable storage media as recited in claim 13, further comprising additional program instructions that, when executed on or across the one or more processors, perform:
  determining that the first transaction and the second transaction are related based at least in part on an account identifier associated with the first transaction and the second transaction.

20. The one or more non-transitory computer-readable storage media as recited in claim 19, wherein the first record and the second record are associated with an attribute identifying the account identifier as a basis for the determination that the first transaction and the second transaction are related.

\* \* \* \* \*